United States Patent [19]

Teraguchi et al.

[11] Patent Number: 4,672,484
[45] Date of Patent: Jun. 9, 1987

[54] TAPE PLAYER CHANGING MECHANISM

[75] Inventors: Yuji Teraguchi; Sadayoshi Endo, both of Tokyo, Japan

[73] Assignee: Clarion Co., Ltd., Tokyo, Japan

[21] Appl. No.: 691,663

[22] Filed: Jan. 15, 1985

[51] Int. Cl.⁴ .................. G11B 15/44; G11B 15/26
[52] U.S. Cl. .................. 360/96.3; 360/74.1; 360/90; 360/105
[58] Field of Search ............ 360/73, 74.1, 90, 93, 360/105, 137, 96.1, 96.3

[56] References Cited

U.S. PATENT DOCUMENTS

| | | | |
|---|---|---|---|
| 4,399,475 | 8/1983 | Shimomae | 360/96.3 |
| 4,425,591 | 1/1984 | Ito | 360/105 X |
| 4,574,322 | 3/1986 | Teraguchi et al. | 360/74.1 |
| 4,581,665 | 4/1986 | Ito et al. | 360/96.3 |
| 4,586,103 | 4/1986 | Uehara | 360/137 |

FOREIGN PATENT DOCUMENTS

| | | | |
|---|---|---|---|
| 56-83857 | 7/1981 | Japan | 360/137 |
| 57-33452 | 2/1982 | Japan | 360/137 |
| 57-127942 | 8/1982 | Japan | 360/105 |
| 59-148170 | 8/1984 | Japan | 360/137 |

Primary Examiner—Stuart N. Hecker
Assistant Examiner—Benjamin E. Urcia
Attorney, Agent, or Firm—Russell E. Hattis; Stephen R. Arnold

[57] ABSTRACT

A tape player is disclosed, whereby mode plates of the fast forward side and of the reverse side, each having an exclusive driving system and a head plate coupled at least with one of the mode plates and making a forward movement are provided; two electromagnetic plungers are disposed, each of which locks each of the mode plates at a position corresponding to the advanced position of the head plate; a joint plate is disposed rotatably with respect to each of the mode plate; with this joint plate is linked a fast forward and reverse drive plate moving from the central play position toward the left and right fast forward and reverse positions depending on the direction of the rotation of the joint plate; and on said head plate is disposed an engaging part with which a part of the fast forward and reverse plate is engaged, when the fast forward and reverse plate is in the central play position and the head plate advances.

3 Claims, 19 Drawing Figures

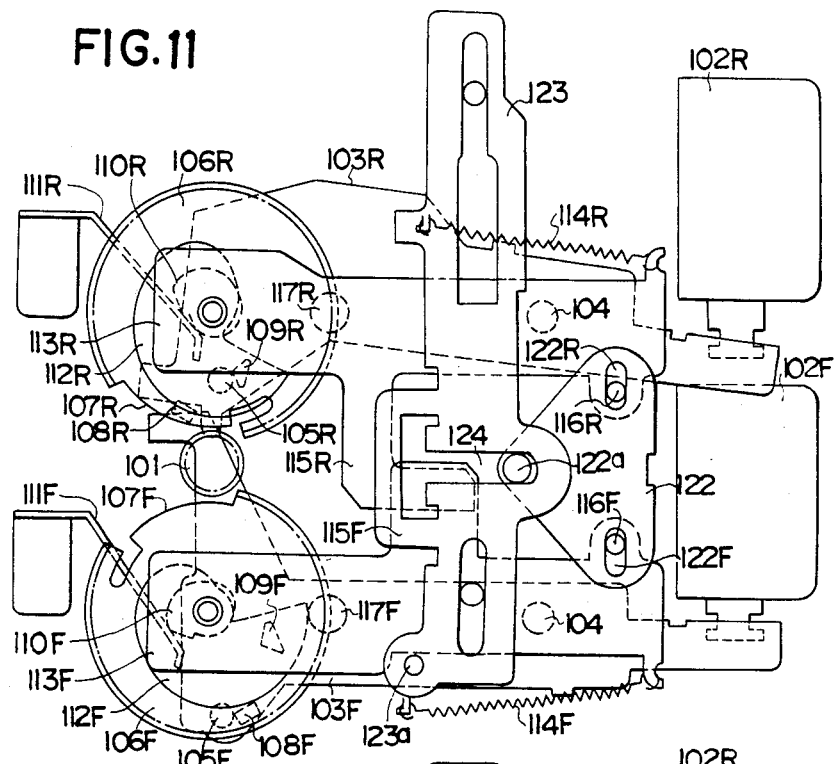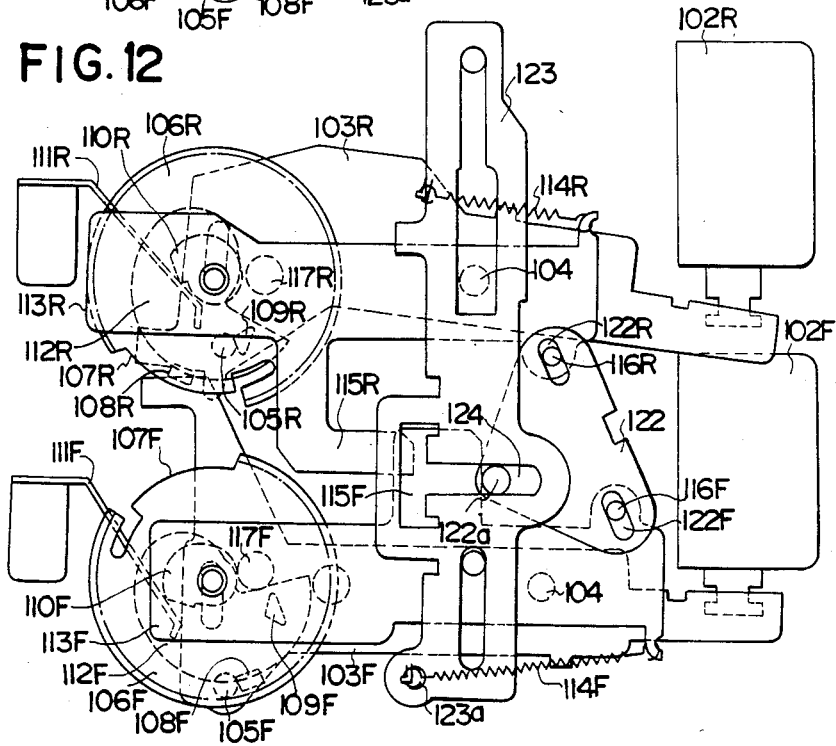

TAPE PLAYER CHANGING MECHANISM

BACKGROUND OF THE INVENTION

1. Field of the Invention

This invention relates to a tape player, in particular to the locking mechanism for locking a part, which is required to have a plurality of locking positions, such as locking of the head plate for play and for fast forward or reverse drive, by using a single electromagnetic plunger, and to a key-off mechanism causing to return automatically the tape brake to the stop state, when the power source is switched off in any mode state.

2. Description of the Prior Art

Recently, automation of tape players has advanced and it has been proposed to use the driving force of a motor or the attractive force of an electromagnetic solenoid actuated plunger, for these automatic operations. Among them, since even with a relatively small capacity motor it is possible to obtain a fairly large driving force by using a reduction gear, the driving force of a motor is often utilized for displacement of parts for commuting between different modes. On the other hand, an electromagnetic plunger is often utilized for locking the parts which have reached their predetermined position by using a motor, because its work is done instantaneously and its control is easy.

In general, a tape player has the modes and functions utilized such as stop, play, fast forward drive, reverse, channel change and pause, and if all of these operations are automated, an exclusive driving system and locking mechanism is necessary for each of these operations except for stop. Therefore it has been attempted to make a tape player smaller and simpler by making the driving system and locking mechanism have a plurality of functions.

From this point of view the applicants have already proposed a following tape player.

This mechanism is provided with two cam gears which are coupled with a motor and two mode plates driven by each of the cam gears, and when the locking of one of the cam gears is released and a mode plate is moved by the rotation of the cam gear, the fast forward drive mode or the reverse mode is established. On the other hand, when the locking of both the cam gears is released and both the mode plates are moved, the play mode is established. In this mechanism, when either one of the mode plates is moved, the head plate advances so that the head is pressed against the tape (at the play mode) or brought in contact the tape (at the fast forward drive mode) and at the same time in the play mode a pinch roller coupled with the head plate is pressed against a capstan shaft or an idler is pressed against the reel base of the take-up side. In addition, in the fast forward drive and the reverse mode, by displacement of either one of the mode plates a change plate coupled with it is moved toward right or left and presses the idler for the fast forward drive and the reverse drive to the idler of the forward or reverse side. During the continuation of the play or fast forward drive or reverse mode, the return of the head plate, etc. to the stop position is prevented by locking the cam gear in the course of its rotation by means of one of the electromagnetic plungers and by locking the mode plate at its advanced position.

Certainly, since, in a tape player as described above, three modes, i.e. play, fast forward drive and reverse, are realized by two systems, each of them consisting of a driving system and a locking mechanism, it can contribute considerably to miniaturization and simplification of the mechanism of the tape player. However, in order that a tape player can be made still smaller and simpler, the following problematical points are confronted.

That is, in the mechanism described above, since the electromagnetic plungers of the fast forward drive side and that of the reverse side lock the respective one of the mode plates, at the play mode two mode plates, both of which are at their advanced position, are locked simultaneously by the two electromagnetic plungers. As the result, for the operations effected in the play mode, such as program change, pause, etc. these two electromagnetic plungers cannot be used. Consequently, the domain of utilization of the two electromagnetic plungers is considerably limited and they can respond only to three modes, play, fast forward drive and reverse. For this reason, for such operations as program change, pause, etc., the tape player should be provided with another locking mechanism using separate electromagnetic plungers, which prevents the miniaturization of the player and also gives rise to the drawback of complicating the control system.

Moreover, for a tape player mounted in a car, such as a car stereo, etc., the interruption of the power source during the operation of the tape player due to removal of the car key, so-called key-off is often done. In the tape players mentioned above, when a key-off is done at the stop position, since the press state between the pinch roller and the capstan shaft is released, no problem is encountered. However, when the power source is switched off at the working state or in the course of an operation change, the motor ceases to rotate in a state where the cam gear and the driving gear remain engaged, and the cam gear stops in the course of its movement. Being pressed by the cam gear, the mode plate stops also in the course of a movement and it becomes impossible to eject the cassette, or the head plate remains at its advanced position, what gives rise to an inconvenience that the press state of the pinch roller or the idler coupled with it is not released. Further, even if the locking of the driving gear and the cam gear is released, there is a risk that the cam gear is prevented from rotating by the returning force of the head plate, etc. transmitted through one of the mode plates, the mode plate stops there, and its press state is not released.

In this case, the pinch roller and the idler constituting the press mechanism remain to be pressed, which gives rise to wow deficiencies due to rotation fluctuation produced by deformation of the gum ring of the pinch roller or the idler. Furthermore, when the press mechanism is removal at its working position, this produces a drawback that removal of the tape becomes impossible.

SUMMARY OF THE INVENTION

An object of this invention is to provide a locking mechanism permitting to obtain a tape player which is smaller and simpler than a prior art tape player, by which the locking of each of the moving parts at the fast forward drive, reverse and play modes can be effected respectively by using only one electromagnetic plunger and the other operations, such as program change, pause, etc., can be controlled by another electromagnetic plunger.

Another object of this invention is to provide a keyoff mechanism, by which even if the power source is switched-off during an operation or in the course of an operation change, the pinch roller and the idler return always to their stop position and thus deterioration of these compression mechanisms is prevented, so that removal of the tape is always possible.

In order to achieve these objects, a tape player according to this invention is so constructed that a mode plate on the fast forward drive side and that on the reverse side, both having their respective exclusive driving systems, are coupled through a joint plate rotatably mounted on both of them; when only one of the mode plates advances, said joint plate rotates either to left or to right; when both the mode plates advance, said joint plate also advances and at the same time the fast forward drive plate and the reverse plate are moved from their central position for the play mode to the position for the fast forward drive mode and to that for the reverse mode, respectively, at the same time as the rotation of the joint plate occurs.

Further, on the head plate advancing with the advance of at least one of said mode plates is disposed an engaging part and at the play mode the fast forward drive and reverse plates in their neutral position are engaged therewith, and by this manner displacement of the fast forward drive and reverse plates and rotation of the joint plate coupled therewith are prevented. Thus, even if the locking of one of the two electromagnetic plungers holding the mode plates at their advanced position is released, as far as the head plate is locked through the mode plate by theother electromagnetic plunger, the fast forward drive and reverse plates as well as the joint plate do not move and the play mode is maintained.

Further, in a tape player according to this invention, the urging of the head plate and related structure is effected by a cam gear beginning to rotate by energizing the electromagnetic plungers and a lock plate coupled with the left and right mode plates moving by being urged by this cam gear. Specifically, this lock plate is slidably mounted on the lock link, and when at the moment of a key-off power supply to the electromagnetic plungers is intercepted, the lock link is rotated. Thus, it releases the engagement of the lock plate on the lock link with the mode plates, and even if the mode plates do not return, it returns the engaging mechanism, such as the lock plate and the head plate coupled therewith, to its stop position, so that the engagement of the pinch roller, etc. is released.

BRIEF DESCRIPTION OF THE DRAWINGS

FIG. 11 a plan view showing the same relation in the fast forward drive state;

FIG. 12 is a plan view showing the same relation at the beginning of the stop operation;

DESCRIPTION OF THE PREFERRED EMBODIMENTS

Figure 1A:
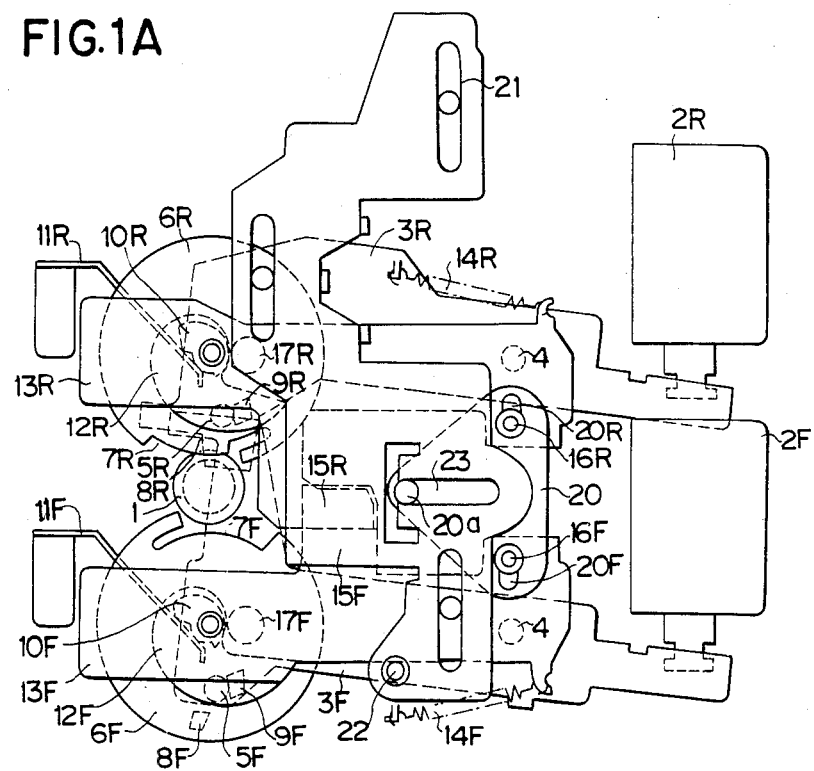
FIGS. 1A and 1B are plan views of the driving portion in the stop state in a locking mechanism according to this invention.

Hereinbelow an example of this invention will be explained concretely, referring to the drawings.

[1] Construction (1) Driving Portion of the Fast Forward Drive Side:

This tape player has two driving portions, i.e. that of the forward side and that of the reverse side, extending in the left and right direction in FIG. 1A. These two portions are arranged in parallel in the up and down direction in FIG. 1A. Between cam gears, described later, each of which is disposed on each of the driving portions, is mounted a fly wheel 1 for driving, which is common to the two driving portions.

The driving portion of the forward side arranged in the lower part of FIG. 1A is constructed as follows. An extremity of a lock arm 3F is connected to an electromagnetic plunger 2F mounted on the right end of a tape player. This lock arm 3F is so mounted that it can rotate counterclockwise around a shaft 4 disposed at its center portion, when the plunger is ON, and clockwise, when the plunger is OFF.

This lock arm 3F is a plate-shaped member extending horizontally in the figure. On the upper surface of its left end is formed a protruding lock part 5F. This lock part 5F is so formed that its extremity is roller-shaped and engageable with the stop part and the mode part of the cam gear, which is explained in the following.

Over the lock arm 3F is disposed the cam gear 6F near the driving gear 1 stated above. This cam gear 6F has a cut-off section 7F at its periphery, where there are no teeth. When this cut-off section is opposite to the driving gear 1, no driving force is transmitted from the driving gear thereto, and when the cut-off section is deviated therefrom, the cam gear 6F engages with the driving gear 1 and is rotated by the latter.

On the rear surface of the cam gear 6F are disposed a mode part 8F, which is at the opposite side to the cut-off section, and a stop part 9F, which is at a position inside of the mode part 8F and slightly deviated counterclockwise from it. These mode part 8F and stop part 9F are so arranged that the lock part 5F can pass therethrough, i.e. when the plunger is in the OFF state, the stop part 9F and the lock part 5F can engage with each other and when the plunger is in the ON state, the mode part 8F and the lock part 5F can engage with each other.

Further, at the center portion of the rear surface of the. cam gear 6F is disposed a spiral take-in cam 10F having two curved portions at its periphery. Against the surface of this take-in cam 10F is always pressed a spring plate 11F, which is fixed to the base plate of the tape player and energizes the take-in cam 10F clockwise. This spring plate rotates this cam gear a little, when the lock of the cam gear is released at the beginning of a play, so that the driving gear and the cam gear engage with each other. In addition, when the cam gear remains in the stop state, this spring plate 11F presses the curved portion inthe short radius side of the take-in cam, and when the cam gear rests in the play state, it presses the curved portion in the long radius side.

On the other hand, on the surface of the cam gear is disposed a driving cam 12F having a spirally enlarged shape. Further on the surface of this driving cam 12F is disposed a mode plate 13F freely going and returning in the left and right direction in the figure, which is always energized by a spring 14 in the direction away from the plunger. On the lower surface of this mode plate 13F at the cam gear side is disposed a roller-like cam follower 17F, which is in contact with the outer periphery of the driving cam 12F stated above. The position of this cam follower is so determined that it is located at the position where the radius of the cam gear 6F is shortest in the state that the cam gear 6F does not engage with the driving gear 1 so that it does not rotate. At the driving gear side of this mode plate 13F is disposed a protruding press part 15F near the middle point of the stroke, which presses the pin of a lock plate, as explained later, when the mode plate 13F advances (toward right in the figure). Further an engaging pin 16F protrudes from the surface nearer to the plunger at the press part side and engages with a joint plate explained later.

(2) Driving Portion of the Reverse Drive Side:

The driving portion of the reverse drive side is disposed in parallel to the driving portion of the forward drive side and comprirses similarly an electromagnetic plunger 2R, a lock arm 3R, a lock part 5R, a cam gear 6R, a cut-off section 7R, a mode part 8R, a stop part 9R, a take-in cam 10R, a spring plate 11R, a press part 15R, an engaging pin 16R and a cam follower 17R.

However, the cut-off section 7R formed in the cam gear 6R is so located that it is pposite to the cut-off section 7F of the cam gear 6F so that it is in the face of the driving gear 1 at the stop state.

(3) Slide Plate and Joint Plate:

Between the two mode plates 13F, 13R is disposed, freely go and returning a slide plate 18, which is parallel to them. A small hole 18a is formed approximately in the center portion of this slide plate 18 and in this small hole 18a is inserted a pin 19a extending upward from at the middle point of a lock plate 19 disposed freely going and returning under the slide plate 18. This pressed pin 19a has such a length that it reaches the mode plates 13F, 13R described above and touches the parts 15F, 15R of the mode plates 13F, 13R. In addition, the slide plate 18 and the lock plate 19 are restricted by slide grooves 18b of the slide plate and pins P of the base plate so as to move parallel to the displacement direction of the mode plate.

On the other hand, over the mode plate 13F, 13R is disposed between them a joint plate 20 with the base plate of the tape player between. The joint plate 20 has approximately a form of an equilateral triangle, at an apex portion of which a guide pin 20a is disposed. In addition, near the two other apices are formed slits 20F and 20R, respectively, in which engaging pins 16F, 16R of the mode plate 13F, 13R described above are inserted. Further, these engaging pins 16F, 16R move in slits formed in the base plate of the tape player which is not shown in the figure and are restricted so as to be displaced always parallel to the horizontal direction in the figure.

(4) Fast Forward and Reverse Drive Plate:

At a position approximately superposed on the joint plate described above is disposed a fast forward and reverse drive plate 21. This fast forward and reverse drive plate 21 is mounted on the base plate of the tape player so as to be freely displaced from the forward side to the reverse side and vice versa. At the extremity of the forward side of the fast forward and reverse drive plate 21 is disposed a fast forward and reverse drive pin 22 coupled with a search link, which is at a head plate side as explained later. In addition on a part of the fast forward and reverse drive plate 21, which is superposed on the center portion of the joint plate 20, is formed generally T-shaped guide 23 in the advance direction of the joint plate and the guide pin 20a of the joint plate 20 stated above engages with this guide slot 23. Thus the guide pin 20a goes and returns in th guide slot 23, when the joint plate 20 moves forward and backward.

(5) Head Plate Mechanism:

A head plate 25 (FIG. 5), which a head 24 is mounted, is supported movably in the direction of the width of the tape player in the figure and is always energized in the backward direction (toward left in the figure) by two springs 26, 27. This head plate 25 is controlled so as to be advanced by the driving force of the driving portions against the force of the springs 26, 27 so that the head 24 comes to a position where it is pressed against the surface of the tape T proceeding so as to bridge two capstan shafts 28F and 28R at the play mode of the tape player.

On this head plate 25 is mounted at its right side portion a hold plate 29 rotatably around a shaft 30. At one end of this hold plate 29 is disposed a pin 31 for the forward drive, which engages with a head plate arm described later. In addition this hold plate 29 is linked through a spring 32 with the head plate 25 and always energized in the backward direction of the head plate. The energizing force of this spring 32 is greater than that of the springs 26, 27 of the head plate 25.

On the rear surface of the base plate of the tape player is mounted a head plate arm 34 rotatably around a mount shaft 33. This head plate arm 34 has two arms, i.e. an upper arm and a lower arm. The pin 31 for the forward drive of the head plate stated above engages with a small hole 34a *formed at the extremity of the upper arm and a linkage pin 18c* disposed on the slide plate 18 engages with the extremity of the lower arm.

The search link 35 is mounted on the surface of the base plate of the tape player freely rotatably also around and with respect to the mount shaft 33 of the head plate arm. On this search link 35 is mounted a control roller 35a, which engages with a control hole 36 formed in the head plate 25. The control hole 36 is an ramified hole having a U-shaped ditch 36P at the head side with a left and a right recess part 36F and 36R, which are shallower than the U-shaped ditch. The search link 35 is fixed parallel, when the control roller 35a enters the U-shaped ditch 36P, and the search link 35 is fixed obliquely, when the control roller 35a enters the left and right recess parts 36F, 36R.

Furthermore this search link 35 has a small hole 35B at its extremity, with which the fast forward and reverse drive pin 22 mounted on the fast forward and reverse drive plate 21 stated above is always linked, and this fast forward and reverse drive pin 22 makes the search link 35 rotate by moving forwardly and backwardly in a slit 37 formed in the base plate of the tape player.

Between the search link 35 and the surface of the base plate is inserted a search plate 38 and the latter engages with the former so that they are linked with each other, by a pin 31 for advancing the head plate. This search plate 38 has a concave part 38a at the extremity of the head 24 side, which engages with the fast forward and reverse drive pin 22, and restricts the movement in the left and right direction of the fast forward and reverse drive pin, when it is in the stop position. In addition the search link 38 is energized by a spring 38b with respect to the base plate of the tape player. Further the energizing force of this spring 38b is smaller than that of the springs 26, 27 of the head plate 25 mentioned above.

Furthermore, between the head plate 25 and the base plate of the tape player are disposed a roller change plate 39 coupled with the pinch roller and an idler change plate 40 coupled with an idler gear for driving the reel base, and the roller change plate 39 is displaced together with the forward and backward movement of the head plate 25 by a member which is not shown in the figure. Further, on the lower side of the roller change plate 39 (FIG. 5) is disposed a roller 39a, which is inserted in a hole 40a formed in an idler change plate 40. Due to the engagement of this roller 39a with the hole, these two plates move mutually freely in the forward and backward direction and are coupled with each other in the left and right direction, when they advance. With a small hole 40b formed at the extremity of the idler change plate 40 is engaged an extremity of a reverse link 41 linking a program change mechanism explained later and the plate.

(6) Off-Plate:

On the lower surface of the lock arm 3R of the driving portion of the reverse side described in (1) is mounted an off-plate 42 (FIG. 8) on the lock arm 3R so as to move together with it but to be able to move freely forwardly and backwardly with respect to the lock arm 3R. This off-plate 42 is linked by a spring 43 with a pin 18d for the off-plate disposed on the slide plate described above and always energized in the advance (rightward) direction of the slide plate 18. On this off-plate 42 is formed a change control hole 44 in which a change pin of a change off plate explained later is inserted. This change control hole consists of a wide release part 44a and a narrow restraint part 44b and it is so constructed that the change pin enters the release part 44a, when the off-plate 42 is in the retreated position, and it dnters the restraint part 44b, when the off-plate 42 is in the advanced position.

(7) Program Change Mechanism:

Behind the driving portion of the reverse side is disposed a program change mechanism, which consists of the change off plate 45, a change gear 46 and a switch change plate 47.

The change off plate 45 is a plate-shaped member, on which a change pin 45a inserted in the change control hole 44 described above and agear lock part 45b stopping and locking the change gear are mounted, and which is mounted freely going and returning on the base plate of the tape player. In addition the displacement direction of this change off plate 45 is perpendicular to the displacement direction of the mode plate, etc. in the driving portions described above and the change off plate 45 is energized by a spring 45c in the backward direction.

On the rear surface of this change off plate 45 approximately at its center portion is mounted a change gear 46. This change gear 46 is an intermittent gear having two cut-off portions 46a, where there are no teeth, which are opposite to each other. When one of these cut-off portions is opposite to a fly wheel gear 48, the rotation of the fly wheel gear 48 rotated always by a motor is not transmitted and when the position of these cut-off portions is deviated, the change gear 46 engages with the fly wheel gear 48 and rotates. On the surface of this change gear 46 are disposed two stopping portions 46b, which are opposite to each other in the direction perpendicular to the line connecting the two cut-off portions. There stopping portions can engage with the gear lock part of the change off plate 45 described above.

In addition, on the rear surface of the change gear 46 is disposed a switch change plate 47. In the switch change plate 37 is formed a slit 47a, in which a pin 46c mounted on the change gear 46 is inserted, and in this way the rotation of thc change gear 46 is transmitted to the switch change plate 47. An extremity of this switch change plate 47 is mounted freely going and returning on the base plate of the tape player and moves forwardly and backwardly in the same direction as the change off plate 45, when the change gear 46 rotates. Further at the head side of the switch change plate 47 is formed a rectangularly shaped cutout part 47b, in which the reverse link 41 mentioned above is inserted and linked with the idler change plate 40 in this way. Either one of the pinch rollers, the forward side or the reverse side, is pressed against the capstan shaft, and at the same time the idler gear engages with one of the reel bases, the forward side or the reverse side. In this way a program change is performed.

Furthermore, a plate spring is disposed on the switch change plate 47 and this constitutes the pressing piece for a switch (not shown) for commuting the output signals of the head.

Figure 1B:
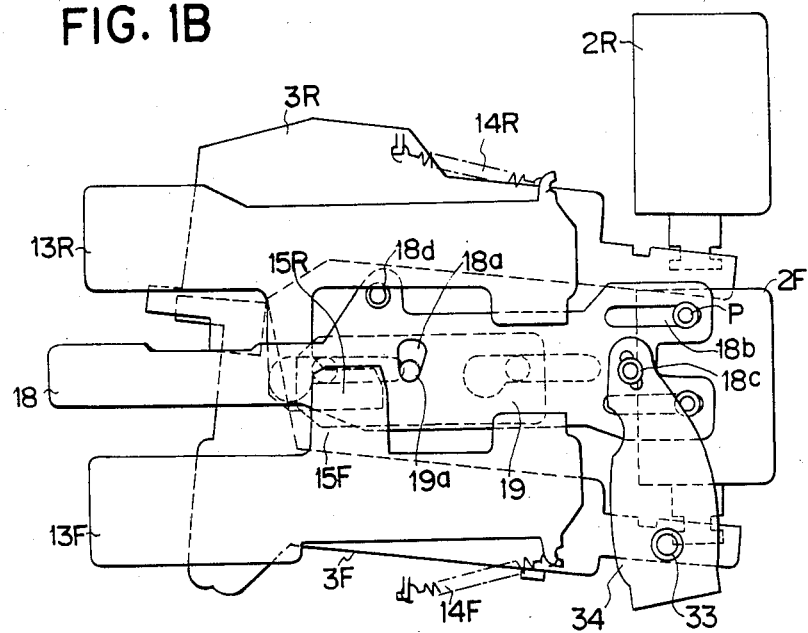
Figure 5:
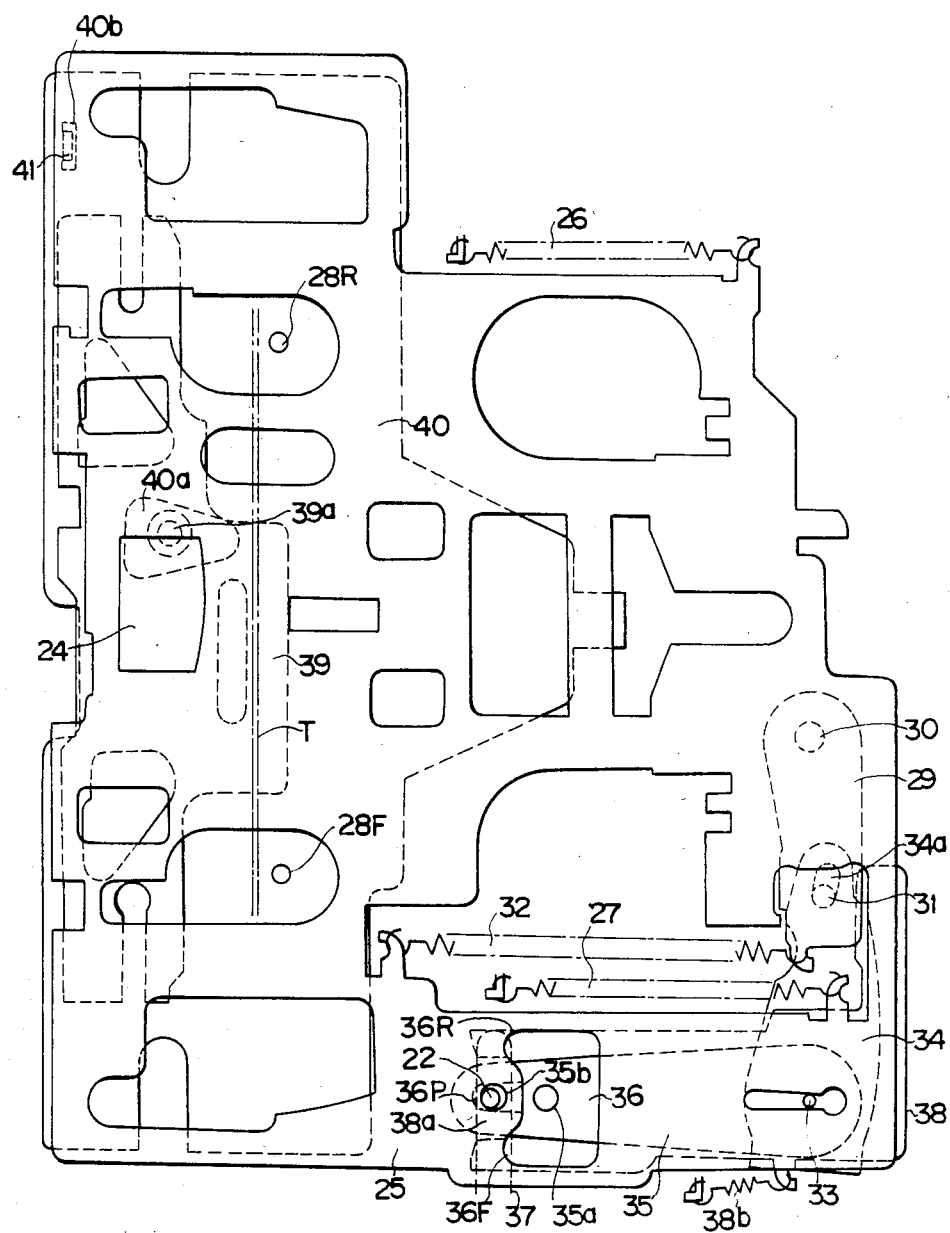
FIG. 5 is a plan view of the mechanism of the head plates side in the stop state.

[2] Working Mode (1) Stop State . . . FIGS. 1A, 1B and 5

In the stop state, since both the electromagnetic plunger of the forward side 2F and the electromagnetic plunger of the reverse side 2R are OFF, both the lock arms 3F and 3R remain rotated clockwise. At this time the cut-off portions 7F and 7R of the cam gears 6F and 6R are opposite to the driving gear 1 and the lock parts 5F and 5R of the lock arms engage with the stop parts 9F and 9R of the cam gears, respectively. In this way, notwithstanding each of the spring plates 11F and 11R touches the curved portion of the short radius side of the respective take-in cam and presses the take-in cam so that it tries to touch its flat part, the cam gears 6F and 6R do not rotate. Consequently all of the mode plates 13F, 13R, the slide plate 18 and the lock plate 19 remain in their retreated position. The joint plate 20 linked through the engaging pins 16F and 16R with the mode plates 13F and 13R, respectively, is in its retreated position, maintaining its parallel state. Further, since the guide pin 20a mounted on the joint plate 20 is also in its neutral position, the guide pin 20a presses the guide ditch 23 of the fast forward and reverse drive plate 21 neither toward the forward side nor toward the reverse side and thus the fast forward and reverse drive plate 21 stops at the middle point of its displacement stroke.

On the other hand the head plate arm 34 linked by the linkage pin 18c mounted on the slide plate 18 with the slide plate 18 is rotated counterclockwise, because the slide plate 18 is in the retreated (leftward) position. Since the upper arm of the head plate arm does not press the pin 31 for advancing the head plate inserted in the small hole 34a formed at its extremity, the head plate 25 does not advance and is in the retreated position due to the energizing force of the springs 26, 27. Since the head plate arm 34 is rotated counterclockwise and the head plate 25 is in the retreated position, the hold plate 29 is also in the retreated position together with the head plate due to the energizing force of the spring 32. Consequently the search plate 38 engaging with the pin 31 for advancing the head plate is also in the retreated position due to the energizing force of the spring 38b and restricts the movement of the fast forward and reverse drive pin 22 by the concave part 38a.

Since the fast forward and reverse drive plate 21 is in the neutral position, the search link 35, which is mounted on the rear surface of the head plate 25 and linked with the fast forward and reverse drive plate 21 through the fast forward and reverse drive pin 22, is parallel to the displacement direction of the head plate. Since the head plate 25 is in the retreated position, the control roller 35a of the search link 35 is freely located on the extension line of the U-shaped slot 36P of the control hole 36.

At this time the program change mechanism is in the state described below. At first the change off plate 45 is in the retreated position and since the off plate 42 is not advanced, the change pin 45a of the change off plate 45 is located in the release part 44a of the change control hole 44 formed in the off plate 42. In addition, since the cut-off portion 46a of the change gear 46 is opposite to the fly wheel 48 and the change gear is locked by the fact that the gear lock part 45b of the change off plate 45 and the stopped portion 46b of the change gear engage with each other, the change gear 46 does not rotate. Further the switch change plate 47 coupled with the change gear remains stopped in the retreated position in the direction toward the forwawd side or in the advanced position in the direction toward the reverse side. The idler change plate 40 and the roller change plate 39 successively linked through the reverse link 41 remain also stopped in opposition to each other in the working direction of the program change mechanism. In addition, concerning the working direction of the head plate 25, as stated above, the roller change plate 39 advances together with the head plate 25.

Figure 2A:
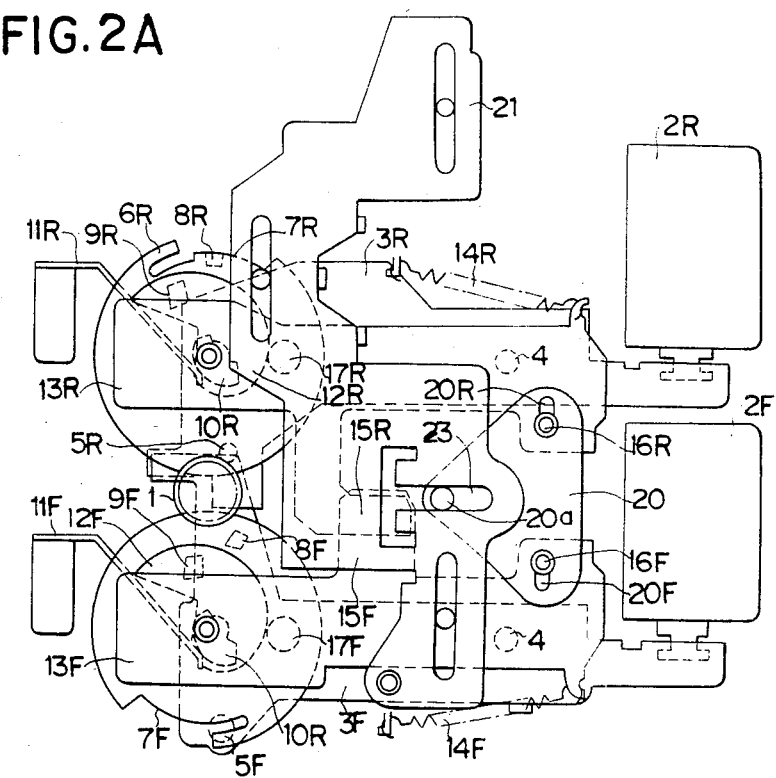
FIGS. 2A and 2B are plan views of the same driving portion at the beginning of the transmission of driving force.
Figure 2B:
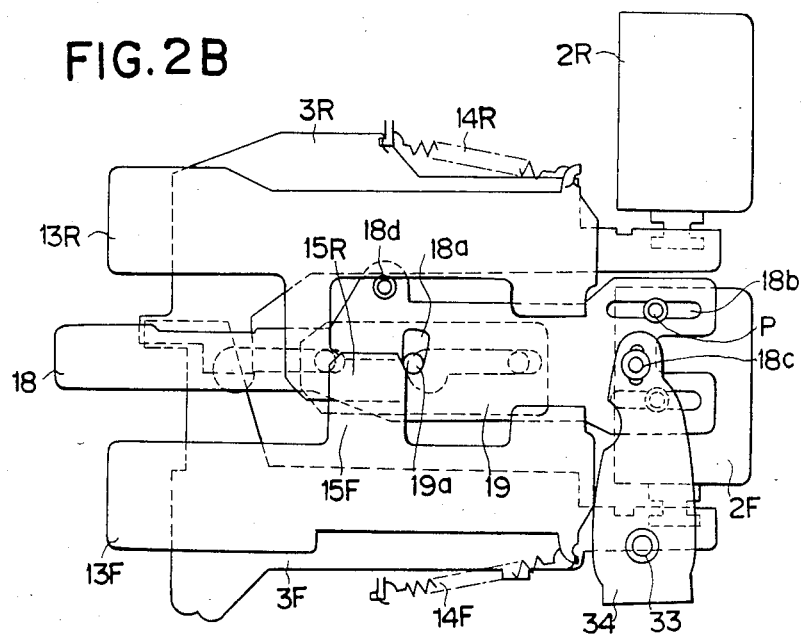

(2) At the Beginning of the Play . . . FIGS. 2A and 2B

The play state (in either direction) is entered by energizing both solenoid 2F and 2R to ON, and shortly thereafter by de-energizing solenoid 2R to OFF. When the power source of the tape player is switched-on and the electromagnetic plungers 2F, 2R are set to ON, the lock arms 3F, 3R rotate counterclockwise and the lock members 5F and 5R of the lock arms 3F and 3R leave the stop parts 9F and 9R of the cam gear, respectively. Then, the cam gears 6F and 6R, which have been stopped against the pressing force of the spring plates 11F and 11R, rotate a little by the fact that the spring plates 11F and 11R leave the curved portion of the take-in cam and are pressed against their flat portion. In this way the fly wheel 1 and the cam gears 6F, 6R engage with each other and the cam gears begin to rotate. At the same time the cam followers 17F, 17R mounted on the mode plates 13F, 13R touch the driving cams 12F, 12R on the surface of the cam gears by a small rotation of the cam gear and advance the mode plates 13F, 13R with the rotation of the cam gear.

As soon as the cam gears begin to rotate, only the electromagnetic plunger 2R of the reverse side is turned OFF and the lock arm 3R rotates clockwise to the same position as that in the stop state. However, since the cam gear 6R has already begun to rotate, even after the plunger 2R returns to OFF, the mode plate 13R advances together with the mode plate 13F of the forward side. Since the stopped pin 19a mounted on the lock plate touches the extension parts 15F, 15R of the mode plates 13F, 13R, the slide plate 18 and the lock plate 19 mounted between the mode plates 13F and 13R advance by the fact that this pressed pin 19a is pressed by the advance of the mode plate.

On the other hand, when both of the engaging pins 16F and 16R of the mode plates advance, the joint plate 20 linked therewith moves also parallel. Since the guide pin 20a of the joint plate is displaced parallel toward right in the figure in the guide ditch 23 in the fast forward and reverse drive plate 21, the fast forward and reverse drive plate 21 is pressed neither toward the forward side nor toward the reverse side and maintains its neutral position.

At this time the constituting members of the head plate side are as follows. The head plate arm 34 coupled with the linkage pin 18c of the slide plate 18 begins to rotate clockwise with the advance of the slide plate 18. Consequently the upper arm of the head plate arm presses the pin 31 for advancing the head plate under the hold plate 29, and the head plate 25, on which the hold plate 29 is mounted, begins to advance. In addition, since the energizing force of the spring 32 energizing the hold plate in the backward direction of the head plate is greater than that of the springs 26, 27 energizing the head plate, the hold plate never rotates only, when the hold plate is attracted in the advance direction, but it advances together with the head plate. When the pin 31 for advancing the head plate of the hold plate 29 reaches a certain predetermined position, the search plate 38 engages with it and begins to advance.

At this time, since the fast forward and reverse drive plate 21 holds its neutral position, the search link 35 holds the same position as in the stop state. In addition, the head plate 25 is still advancing and the control roller 35a has not yet entered the U-shaped ditch of the control hole 36. On the other hand the program change mechanism is not actuated for the following reason. That is, when the plunger of the reverse side moves in (ON), the off plate 42 rotates in such a direction that the lock of the cam gear would be released (counterclockwise in the figure). However, in this state, since the off plate 42 has not yet advanced, the change pin 45a of the change off plate 34 is in the release part 44a of the change control hole 44, and thus notwithstanding the off plate rotation, since the change pin 45 is pressed by none of the sides of the release part, the change off plate 45 is not displaced and no program change is effected.

Moreover, since the plunger 2R is moved to OFF just thereafter and the off plate 42 returns to its original position, even if the off plate 42 advances thereafter and the change pin 45a passes from the release part 44a of the change control hole 44 to the restraint part 44b, the change pin 45a is pressed by none of the sides of the restraint part and no program change is effected.

Figure 3A:
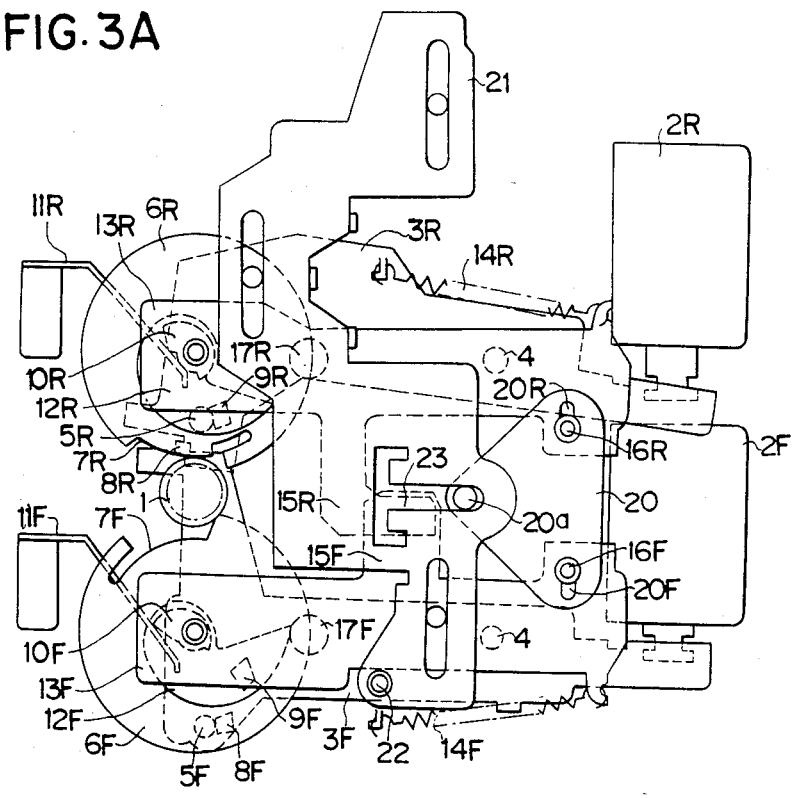
FIGS. 3A and 3B are plan views of the same driving portion in the play state.
Figure 3B:
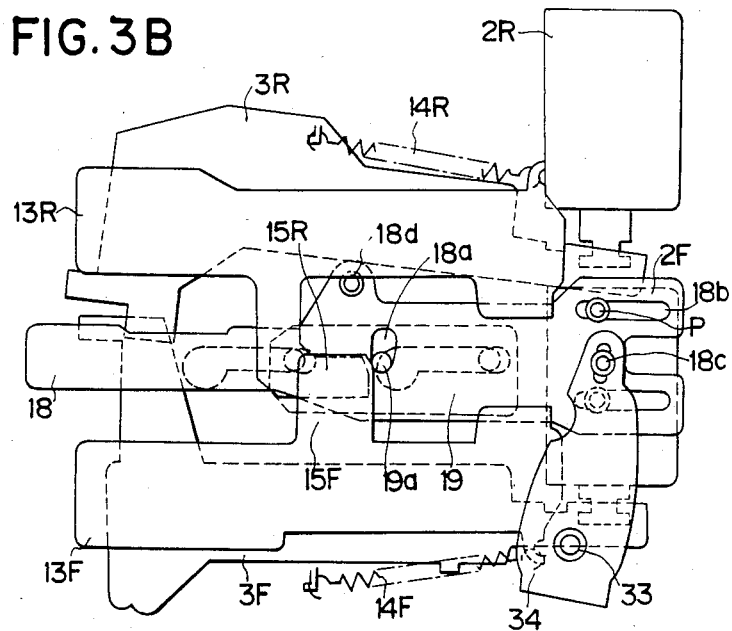
Figure 6:
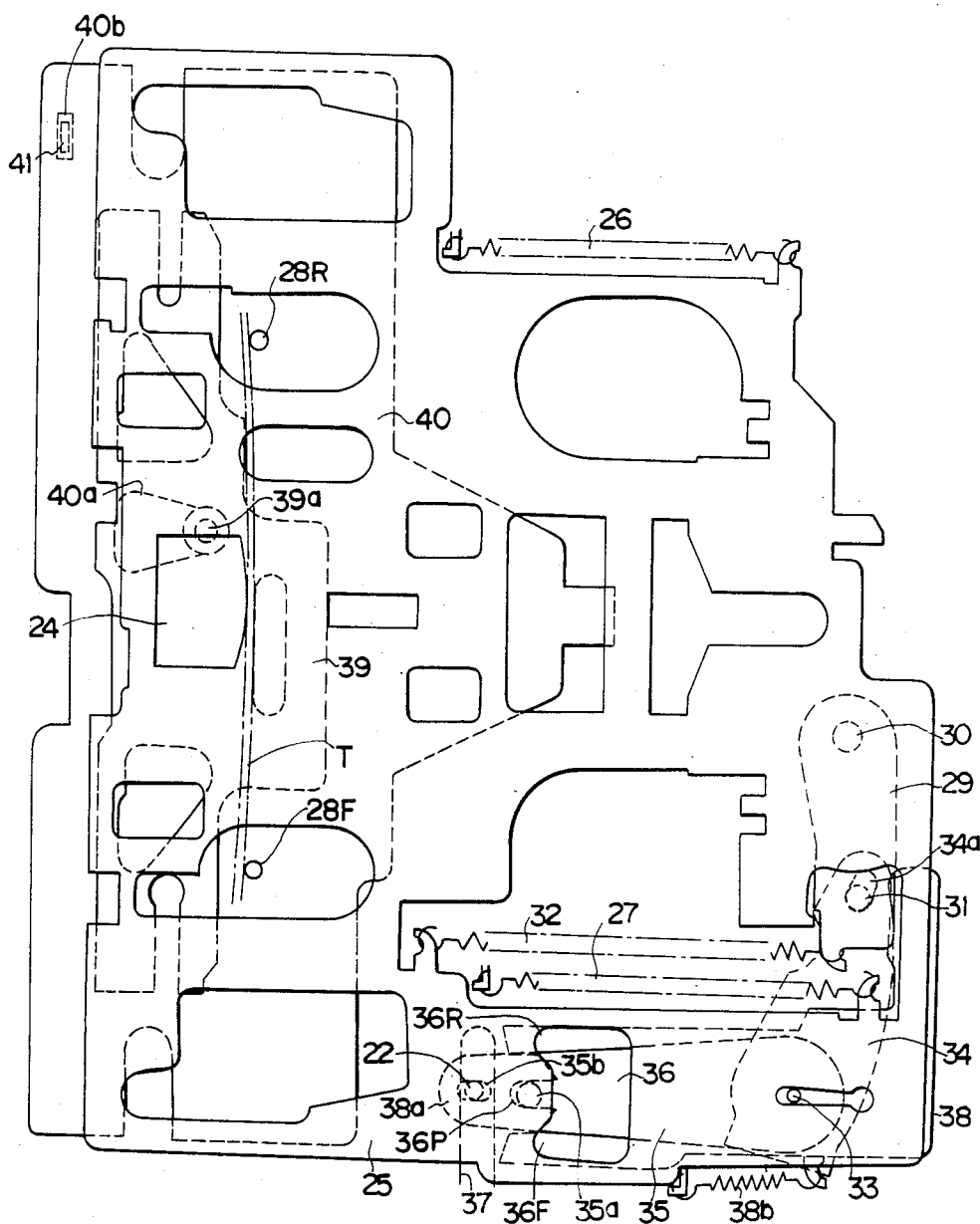
FIG. 6 is a plan view of the mechanism of the head plate side in the play state.

(3) Play State ... FIGS. 3A, 3B and 6

The cam gear of the forward side 6F, which was rotating in the state described in (2), stops its rotation at a position, where its cut-off secton is opposite to the driving gear 1, the lock part 5F of the lock arm 3F and the mode part 8F of the cam gear engage with each other and the cam gear 6F is locked. In addition, since the plunger 2R is OFF and the lock arm 3R is rotated clockwise, the lock part 5R of the cam gear of the reverse side 6R does not engage with the mode part 8R of the cam gear 6R and the cam gear 6R continue to run to make one revolution. Thus the cut-off section and the driving gear 1 are opposite to each other and the stop part 9R and the lock part 5R engage with each other to lock the cam gear 6R.

At this time, since the cam follower 17F is in the longest radius part of the driving cam 12F, the mode plate 13F of the forward side has terminated its forward movement, and at maximum extension both the slide plate 18 and the lock plate 19 have also terminated their forward movement. Consequently, the head plate arm 34 linked with the slide plate 18 makes the head plate 25 terminate its forward movement to a position where the head 24 presses the tape, by pulling the hold plate 29.

On the other hand, since the cam gear of the reverse side 6R makes one revolution, the cam follower 17R of the mode plate 13R, which has terminated its forward movement, is opposite to the shortest radius part of the driving cam and the mode plate 13R tries to retreat due to the spring 14R. However, since the joint plate 20 is fixed parallel at the position where it has terminated its forward movement, the mode plate 13R stops at the advanced position.

That is, when the head plate 25 has terminated its forward movement, the concave portion 38a of the search plate 38 restricts the movement of the fast forward and reverse drive pin 22 in the left and right direction. Since the rotation of the search link 35 is prevented therethrough, the control roller 35a mounted on the search link 35 enters the U-shaped ditch 36P of the control hole 36 formed in the head plate and thus the search link 35 is fixed at its neutral position. Consequently the fast forward and reverse drive pin 22 mounted on the fast forward and reverse plate 21 inserted in the small hole 35b of the search link 35 remains at that position and the fast forward and reverse drive plate 21 is fixed at the middle point of the displacement stroke. Then, although the guide pin 20a of the joint plate 20 located at the extremity inside of the guide ditch formed in the fast forward and reverse drive plate 21 tries to rotate counterclockwise in the figure, it is fixed by being prevented by the guide ditch 23. Finally, the joint plate 20 fixed by the engaging pin 16F and the guide pin 20a is fixed parallel at its advanced position and the mode plate 13R linked with the engaging pin 16R stops also, as stated above, at its advanced position.

All the members work in the manner described above and the play state continues so far as the plunger 2F of the forward side is ON. In addition, at this time, since the plunger of the reverse side 2R is continuously OFF, even if the change pin 45a mounted on the change off plate 45 is located in the restraint part 44b of the change control hole 44 formed in the off plate 42, the change pin 45a is not pressed by the off plate 42 and thus no program change is effected.

Figure 4:
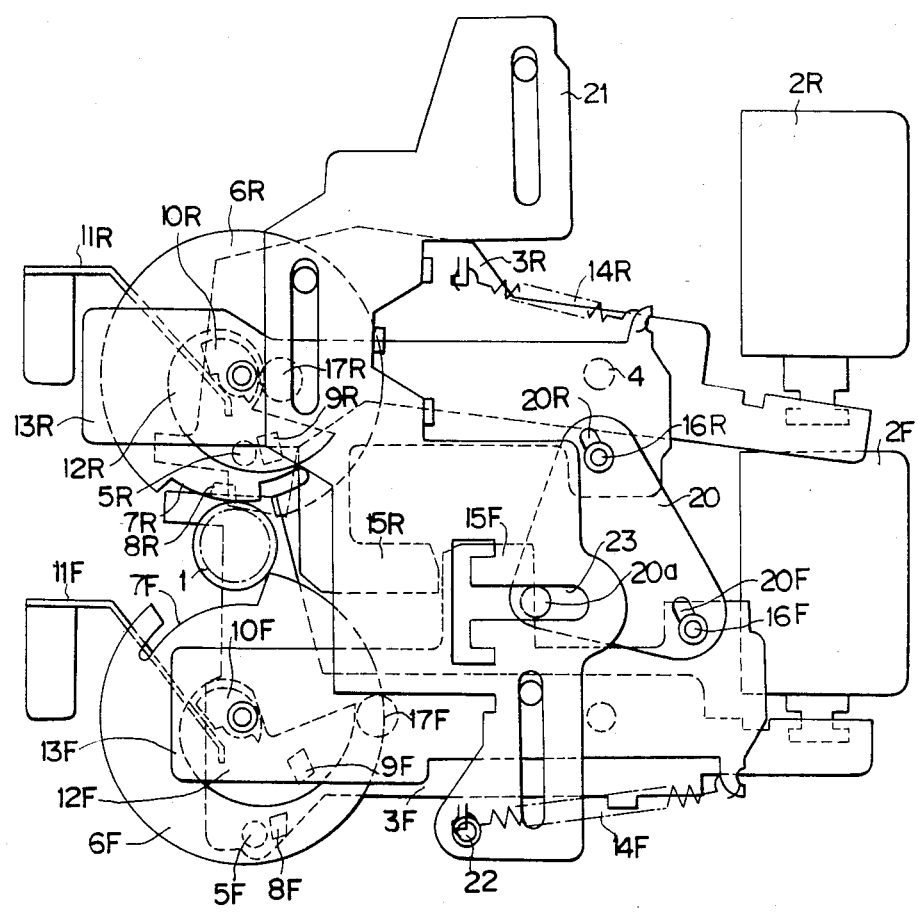
FIG. 4 is a plan view showing the relation between the driving portion at the fast forward drive mode and the fast forward drive an reverse plates.
Figure 7:
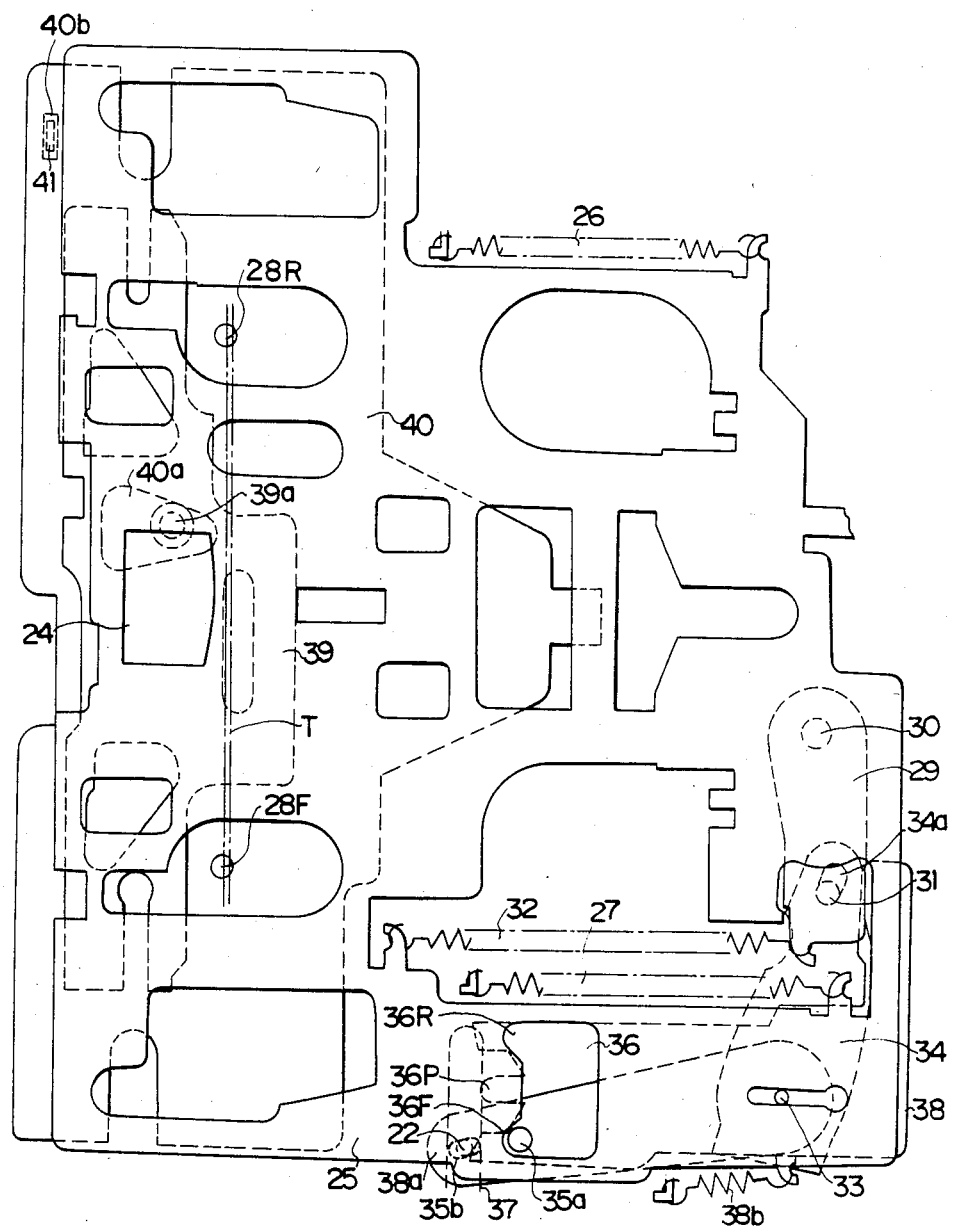
FIG. 7 is a plan view of the mechanism of the head plate side in the fast forward drive state.

(4) Fast Forward and Reverse Drive ... FIGS. 4 and 7.

From the stopped state, the fast drive state is entered simply by energizing solenoid 2F to ON.

When a fast forward drive command is received only the electromagnetic plunger of the forward side 2F becomes ON, and the lock arm 3F rotates counterclockwise. Due to the rotation of the cam gear 6F provoked by the rotation of the lock arm 3F, the mode plate 13F, the lock plate 19, the slide plate 18, the head plate arm 34 and the head plate 25 make a series of movements similar to those described for the play state.

The differences between this state and the play state are as follows. Since the mode plate 13F is displaced and the mode plate 13R is not displaced, the joint plate 20 rotates counterclockwise around the engaging pin 16R of the mode plate 13R. Since the shaft 20a of the joint plate 20 is engaged with the guide ditch formed in the fast forward and reverse drive plate 21, the fast forward and reverse drive plate 21 makes a parallel translation toward the forward drive portion side together with the rotation of the joint plate 20. In addition, since the fast forward and reverse drive pin two is engaged through the slit 37 with a small hole 35b of the search link 35, the search link 35 rotates also in the same direction. By this rotation the control roller 35a on the search link is displaced toward the convex part 36F of the control hole 36 and enters the convex part 36F of the control hole 36 with the advance of the head plate 25. At this time the recess part of the search plate advances with the advance of the head plate and at the termination of the advance of the head plate it releases the engagement of the fast forward and reverse drive pin 22. Due to this movement the fast forward and reverse drive pin terminates its displacement toward the forward side at the same time as the termination of the advance of the head plate.

Being coupled with this movement, the idler gear engages with the reel base of the forward side and a fast forward drive is performed.

In addition, since the recess part 36F of the control hole 36 is shallower than the U-shaped ditch 36P and the head plate 25 is fixed at a nearer position than the play position, the pinch roller and the play idler are in the released state.

In the case of the reverse drive the fundamental movements of the various members are identical to those for the fast forward drive only with a difference that the forward side and the reverse side are replaced symmetrically. That is, the electromagnetic plunger 2F remains OFF and the electromagnetic plunger 2R becomes ON. Thus the mode plate 13R is displaced, the joint plate 20 rotates clockwise and the fast forward and reverse drive plate 21 makes a parallel translation toward the reverse drive portion side. Further the control roller 35a on the search link 35 enters the recess part 36a of the control hole 36.

Figure 8:
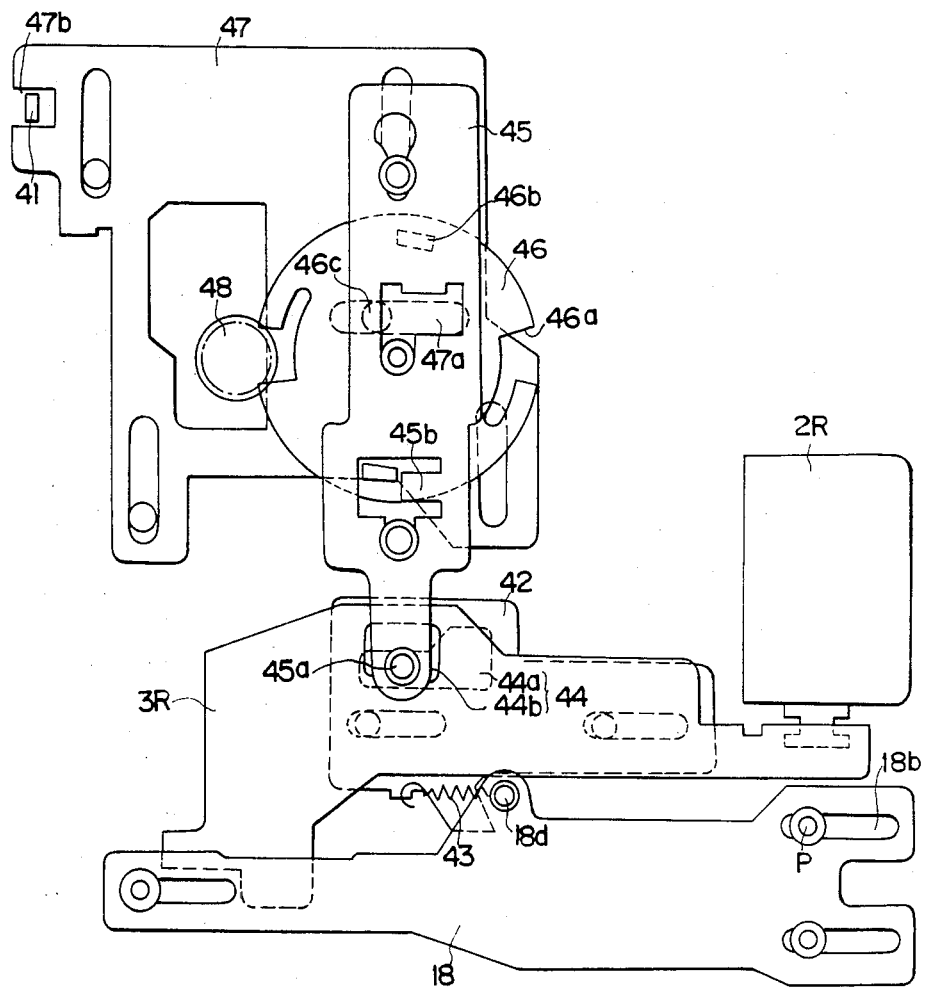
FIG. 8 is a plan view of the channel change mechanism at the beginning of a program change.

(5) At the Beginning of the Program Change ... FIG. 8

From the play state, tape drive reversal (program change) is accomplished by momentarily energizing solenoid 2R to ON.

In the play state described in (3), when the program change switch is pushed, the electromagnetic plunger of the reverse side 2R, which has been in the OFF state up to this time, becomes ON. At this time, since the off plate 42 holds its advanced position, the change pin 45a of the change off plate 34 is in the same position as for the play state. Further the plunger 2R becomes ON. When the lock arm 3R rotates counterclockwise, the off plate 42 mounted on the lock arm 3R rotates also and the side of the reverse side of the restraint part 44b in the change control hole 44 presses the change pin 45a of the change off plate 45 toward the forward side.

Due to these movements the whole change off plate 45 is displaced toward the forward side and the gear lock part 45b in the change off plate 45 leaves the gear lock part 46b of the change gear 46. Thus the lock of the change gear 46 rotates slightly and engages with the fly wheel gear 48. Thereafter it begins to be rotated by the fly wheel gear.

Further, it is because the switch change plate 47 is energized so as to be in the neutral position by the spring action of the press piece in the switch commuting output signals of the head, which is mounted on the switch change plate 47, an idler gear neutral position return spring which is not shown in the figures causes that the change gear 46 to rotate slightly and engage with the fly wheel gear 48.

In this way, when the change gear 46 rotates, the pin 46c mounted on its rear surface presses the switch change plate 47. Thus the switch change plate 47 begins to move toward the forward side and the roller change plate 39, not shown in the figure, mounted on the rear surface of the head plate 25 linked through the reverse link 41 with the switch change plate 47 begins to move toward the reverse side.

At the beginning of this program change, when the electromagnetic plunger 2R becomes ON, similarly to the beginning of a play the lock of the cam gear 2R is released and the cam gear 2R begins to rotate. However, since the mode plate 13R has already terminated its forward movement, the cam gear 6R runs idle.

Figure 9:
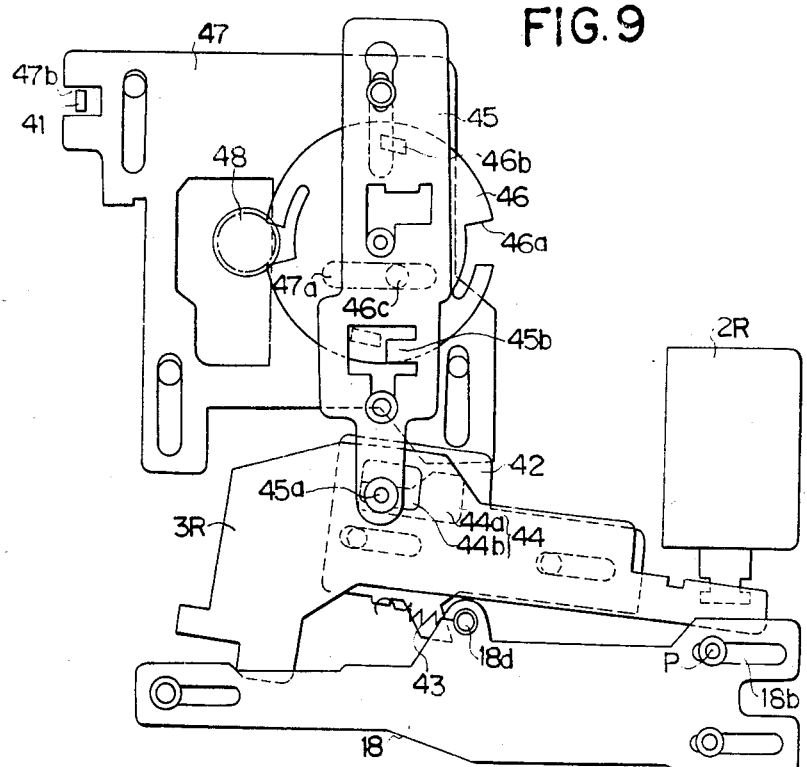
FIG. 9 is a plan view of the channel change mechanism after the termination of the program change.

(6) Termination of the Program Change . . . FIG. 9

The electromagnetic plunger 2R, which was turned ON at the beginning of the program change, reverts immediately again to OFF. Since the lock arm 3R and the off plate 42 rotate clockwise to return to their original position, the change pin 45a, which is located in the restraint part of the change control hole 44 is no more pressed by the side of the reverse side. In this way the change off plate 45 returns to its position in the stop state due to the energizing force of the spring 45c.

In addition the change gear 46 continues to rotate and the switch change plate 47 advances toward the forward side as it does. When one of the stopped parts disposed on the change gear 46, which is at the opposite side to that of the stop state, reaches a position where it engages with the gear lock part 45b of the change off plate 45, due to this movement the change gear 46 is locked and the cut-off section 46a is opposite to the fly wheel 48 so that the change gear stops to rotate.

Moreover, when the cam gear 6R running idle has made one revolution, the cut-off section is opposite to the fly wheel gear 1, and the locking part 5R of the lock arm 3R and the stop part 9R engage with each other so that the cam gear 6R is locked and stops to rotate.

On the other hand, when the switch change plate 47 has terminated its forward movement, the roller change plate 39 of the head plate 25 side linked through the reverse link 41 has also terminated its displacement toward the reverse side. Due to this movement the pinch roller of the forward side leaves the capstan shaft, the pinch roller of the reverse side is pressed against the capstan shaft, and at the same time the idler change plate 40 is displaced toward the reverse side so that the idler gear engages with the reel base of the reverse side. Thus the program change from the forward side to the reverse side has terminated and the reverse drive begins.

In the above only the channel change from the forward side to the reverse side has been explained, but the channel change from the reverse side to the forward side can be also similarly performed.

(7) Termination of Play-Reversion to Stop State:

When in play mode, the stop state is achieved by turning magnetic solenoid 2F off.

When the play state has been terminated, the electromagnetic plunger 2F, which has been ON up to this time, becomes OFF. The lock arm 3F rotates clockwise in the figure and the lock part 5F of the lock arm 3F leaves the mode part 8F of the cam gear. At this time the spring plate 11 is located at the curved portion of the long radius side of the take-in cam 10F. However, since the lock of the cam gear 6F is released, the spring plate 11F presses the take-in cam 10F so that it touches the flat part of the take-in cam and in this way it rotates slightly the cam gear 6F.

Then, the cam follower 17F, which has touched the longest radius portion of the driving cam 12F, leaves it due to the rotation of the cam gear, and the mode plate 13F and the cam follower 17F as well as the joint plate 20 make backward movements by the energizing force of the spring 14F to return to their stop position. At the same time, when the joint plate 20 is no more fixed, the mode plate of the reverse side 13R is energized also by the spring 14R to make its backward movement. On the other hand the take-in cam 10F is further pressed by a spring plate 11F and rotates to a position where the spring plate 11F touches the curved portion of the short radius side, together with the cam gear. Then, since the stop part 9F of the cam gear and the lock part of the lock arm 3F engage with each other, the cam gear 6F stops to rotate.

As described above, when the mode plates 13F, 13R have made their backward movement, the pressed pin 19a of the lock plate 19 is no more pressed by the press parts 15F, 15R of the mode plates 13F, 13R and thus the lock plate 19 and the slide plate 18 linked therewith become free. As a result the head plate loses its supporting force and makes its backward movement due to the energizing force of the springs 27, 28. The control roller 35a leaves the U-shaped ditch 36P of the controller hole and becomes free. On the other hand the slide plate 18 and the lock plate 19 linked with each other through head plate link 34 return to their stop position with the backward movement of the head plate 25.

As explained above, according to this embodiment, since only one plunger is used to lock the play, the fast forward and the reverse state, it is possible to perform the program change by using the other plunger. Consequently an advantage can be obtained that the control of 4 sorts of mode is possible by using 2 electromagnetic plungers.

Further, although only an application to the program change is shown in this embodiment, this invention can be applied also to the pause, etc.

In the following, as another embodiment of this invention, a key-off mechanism of a tape player is explained, referring to FIGS. 10 to 16. Since the mechanism relating to the drive portions of the fast forward side and of the reverse side, the slide plate and the fast forward and reverse drive plate is the same as that described in the preceding embodiment, the description of this mechanism is omitted.

[1] Construction

Under a lock plate 119 is disposed a lock link 120 superposed on the lock plate 119, the base side extremity of which is mounted rotatably around a shaft 120a disposed on the plunger side. At the extremity of the lock link 120 is disposed a pin 120b, which is engageable with the hook parts 103a disposed at the extremities of the lock arms 103F and 103R, respectively. The lock plate 119 is mounted slidably in the length direction of the lock link 120 with a slit 120c of the lock link and a pin 119b of the lock plate and restricted in the width direction by the movement of the lock link 120.

The lock link 120 and the lock plate 119 are so constructed that their rotation is limited from the position where they are parallel to a slide plate 118 toward the drive portion of the reverse side by the roller 119a of lock plate, the location of a ramified hole 118a of the slide plate 118 and the lock arms 103F, 103R. That is, upon the excitation of either of the electromagnetic plungers, i.e., when the lock link 120 and the lock plate 119 are located parallel to the slide plate 118, the roller 119a of the lock plate 119 is located at the forward drive (lower) side in the ramified hole 118a of the slide plate 118, and as described above, touches the extension parts 115F, 115R of mode plates 113F, 113R. When the excitation of the electromagnetic plunger is removed, and the lock link 120 and the lock plate 119 are rotated by spring force not shown in the figure toward the reverse drive side with respect to the slide plate 118, the roller 119a of the lock plate 119 is located at the reverse drive side of the ramified hole 118a and moves away from the press parts 115F, 115R of the mode plates 113F, 113R.

In addition, on the slide plate 118 is disposed a linkage pin 118b linked with the head plate mechanism. This linkage pin 118b is linked with a head plate arm 121 of the head plate. In this way, being coupled with the slide plate 118, the head plate makes a forward and backward displacement to advance and withdraw the head. Further although it is not shown in the figures, the head plate is energized by a spring toward the retreated position and the slide plate coupled with the head plate is also energized by this spring toward the retreated position.

Figure 10:
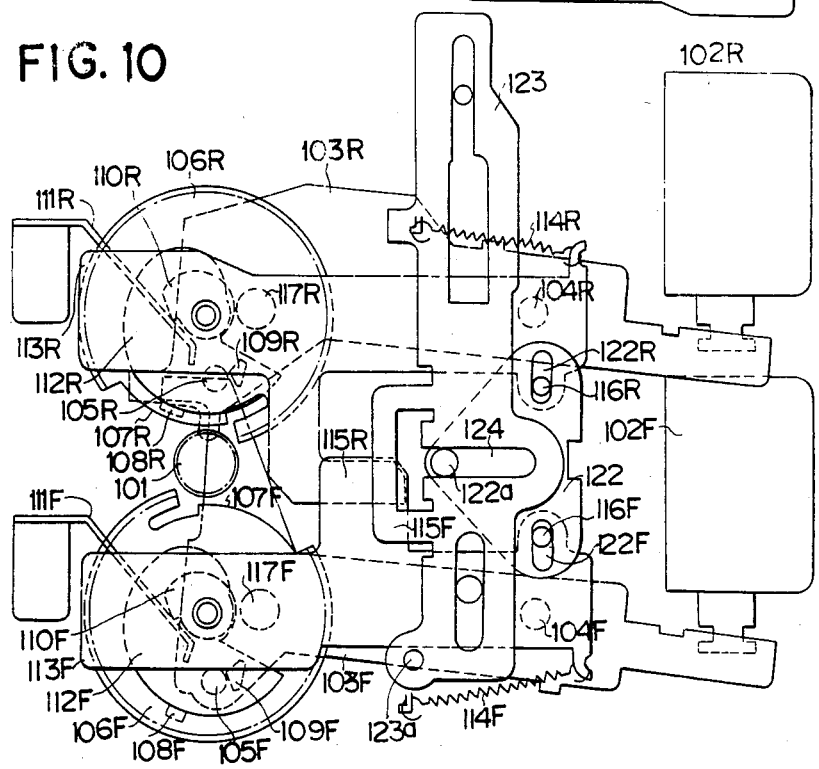
FIG. 10 is a plan view showing the relation between the mode plate and the cam gear of the key-off mechanism in the play state of a tape player according to a second embodiment of this invention.
Figure 13:
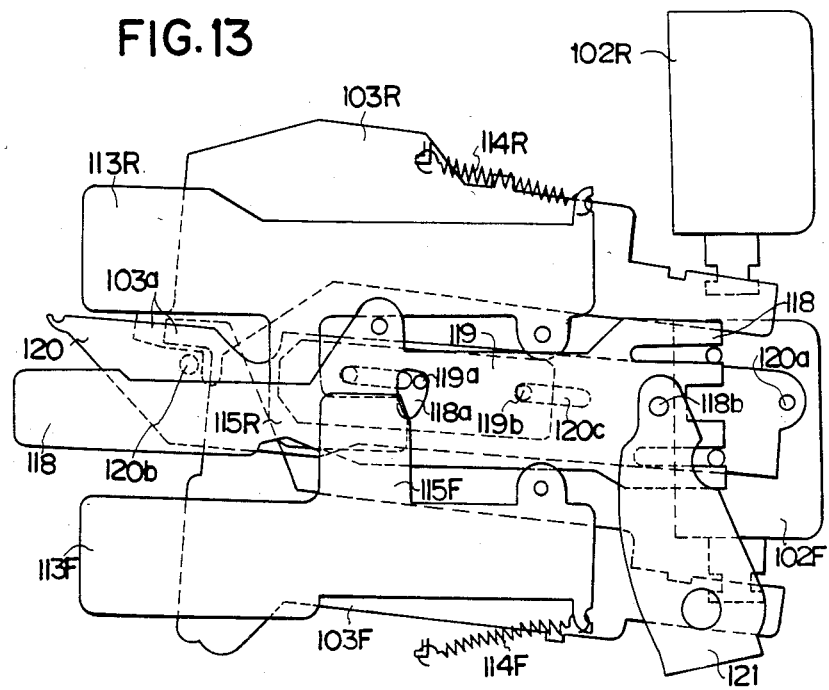
FIG. 13 is a plan view showing the relation between the mode plate and the lock plate of the same mechanism as that shown in FIG. 10 in the stop state.

[2] Working Mode
(1) Stop State . . . FIGS. 10 and 13

In the stop state, since both the electromagnetic plunger of the forward side 102F and the electromagnetic plunger of the reverse side 102R are OFF, both the lock arms 103F and 103R remain rotated clockwise. At this time the cut-off portions 107F and 107R of the cam gears 106F and 106R are opposite to the driving gear 101 and the lock parts 105F and 105R of the lock arms engage with the mode hooks 109F and 109R of the cam gears, respectively. In this way, notwithstanding the fact that each of the spring plates 111F and 111R touches the curved portion of the short radius side of its respective take-in cam and presses the take-in cam so that it tries to touch its flat part, the cam gears 106F and 106R do not rotate. Consequently all of the mode plates 113F, 113R, the slide plate 118 and the lock plate 119 remain in their retreated (left) position. The joint plate 122 linked through the engaging pin 116F and 116R with the mode plates 113F and 113R, respectively, is in its retreated position, maintaining its parallel state. Further, since the guide pin 122a mounted on the joint plate 122 presses the guide ditch 124 of the fast forward and reverse drive plate 123 neither toward the forward side nor toward the reverse side and thus the forward and reverse drive plate 123 stops at the middle point of its displacement stroke.

On the other hand the head plate arm 121 linked by the linkage pin 118b mounted on the slide plate 118 with the slide plate 118 is rotated counterclockwise, because the slide plate 118 is in the retreated position, and the head plate linked with it is also in the retreated position.

Furthermore, since the lock arms 103F, 103R are rotated clockwise, the hook parts 103a, 103a disposed thereon do not press the lock link pin 120b and the lock link 120 remains rotated clockwise.

(2) At the Beginning of the Forward Play Mode.

Forward Play Mode is entered by simultaneously energizing solenoids 102R and 102F. Shortly thereafter solenoid 102R is turned off.

When the key of a vehicle is switched on and the power source is connected to the tape player by the insertion of a cassette or by a play switch operation, both solenoids 102R and 102F are engaged, the lock arms 103F, 103R rotate counterclockwise, and the lock members 105F and 105R of the lock arms 103F and 103R leave the stop hooks 109F and 109R of the cam gear, respectively. Then, the cam gears 106F and 106R, which have been stopped against the pressing force of the spring plates 111F and 111R, rotate a little by the fact that the spring plates 111F and 111R leave the curved portion of the take-in cam and are pressed against their flat portion. In this way the fly wheel gear 101 and the cam gears 106F, 106R engage with each other and the cam gear begins to rotate. At the same time the cam followers 117F, 117R mounted on the mode plates 113F, 113R touch the driving cams 112F, 112R on the surface of the cam gears by a small rotation of the cam gear and advance the mode plate 113F, 113R with the rotation of the cam gear.

On the other hand the lock link 120 rotates with the rotation of the lock arms 103F, 103R and becomes parallel to the slide plate 118. Then, the lock plate 119, which is disposed on the lock link 120 in one body, becomes also parallel to the slide plate 118 so that the roller 119a comes to confront the extension parts 115F, 115R of the mode plates 113F, 113R to touch them.

In this way, as soon as the cam gear begins to rotate, only the electromagnetic plunger 102R of the reverse side becomes ON and the lock arm 103R rotates clockwise to the same position as that in the stop state. However, since the cam gear 6R has already begun to rotate, even if the plunger 102R becomes OFF, the mode plate 113R advances together with the mode plate 113F of the forward side.

On the other hand, since the lock link 120, which is located parallel to the slide plate 118, is engaged by the pin 120b with the hook part 103a of the lock arm 103F, even if the lock arm 103R returns to the stop position, it is held at the same position. At this time the roller 119a of the lock plate 119 is located at the forward drive portion side in the ramified hole 118a and touches the extension parts 115F, 115R of the mode plates 113F, 113R. Consequently the slide plate 118 and the lock plate 119 advance due to the fact that this roller 119a is pressed by the advances of the mode plate.

On the other hand, when both of the engaging pins 116F and 116R of the mode plates advance, the joint plate 122 linked therewith moves also parallel. Since the guide pin 122a of the joint plate is displaced parallel toward right in the figure in the guide ditch 124 in the fast forward and reverse drive plate 123, the fast forward and reverse drive plate 123 is pressed neither toward the forward side nor toward the reverse side and maintains its neutral position.

At this time the head plate arm 121 linked with the linkage pin 118a of the slide plate 118 rotates clockwise with the advance of the slide plate 118 and due to this movement the head plate begins to rotate.

Figure 14:
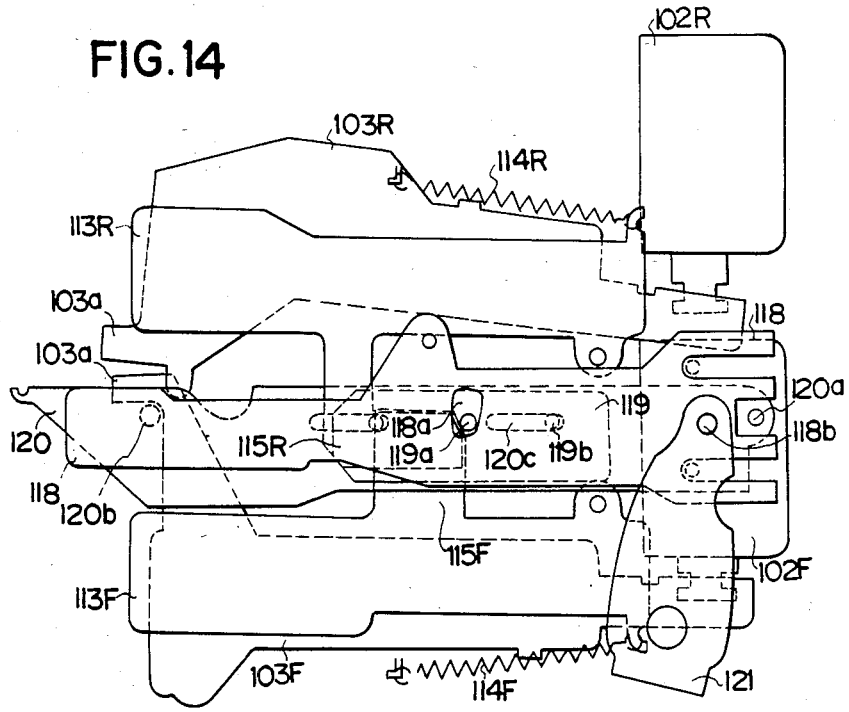
FIG. 14 is a plan view showing the same relation as that shown in FIG. 13 in the play state.

(3) Play State . . . FIGS. 11 and 14

The cam gear of the forward side 106F, which was rotating in the state described in (2), stops its rotation at a position, where its cut-off section is opposite to the driving gear 1, the lock part 105F of the lock arm 103F and the mode hook 108F of the cam gear engage with each other and the cam gear 106F is locked. In addition, since the plunger 102R is OFF and the lock arm 103R is rotated clockwise, the lock part 105R of the cam gear of the reverse side 106R does not engage with the mode hook 108R of the cam gear 106R and the cam gear 106R makes one revolution. Thus the cut-off section and the driving gear 101 are opposite to each other and the stop hook 109R and the lock part 105R engage with each other to lock the cam gear 106R.

At this time, since the cam follower 117F is in the longest radius part of the driving cam 112F, the mode plate 113F of the forward side has terminated its forward movement, and both the slide plate 118 and the lock plate 119 have also terminated their forward movement. Consequently the head plate advances to a position, where the head is pressed against the tape, through the head plate arm 121 linked with the slide plate 118.

On the other hand, since the dam gear of the reverse side 106R makes one revolution, the cam follower 117R of the mode plate 113R, which has terminated its forward movement, is opposite to the shortest radius part of the driving cam and the mode plate 113R tries to retreat due to the spring 114R. However, since the joint plate 122 is fixed parallel at the position where it has terminated its forward movement, the mode plate 113R stops at the advanced position.

That is, when the head plate has terminated its forward movement, the fast forward and reverse drive pin 123a mounted on the fast forward and reverse drive plate 123 engaged with the linkage member of the head plate remains at that position and the fast forward and reverse drive plate 123 is fixed at the middle point of the displacement stroke. Then, although the guide pin 122a of the joint plate 122 located at the extremity inside of the guide ditch formed in the fast forward and reverse drive plate 123 tries to rotate counterclockwise in the figure, it is fixed by being prevented by the guide ditch 124. Finally the joint plate 122 fixed by the engaging pin 116F and the guide pin 122a is fixed parallel at its advanced position and the mode plate 113R linked with the engaging pin 116R stops also at its advanced position.

All the members work in the manner described above and the play state continues so far as the plunger 102F of forward side is ON. In addition, at this time, the plunger of the reverse side 102R is continuously OFF.

(4) Fast Forward and Reverse Drive . . . FIG. 12

Fast Forward operation is entered from the stop condition by energizing only solenoid 102F.

For example, when a fast forward drive command is received, the plunger 102F is attracted, the lock arm 103F rotates, and the cam gear 106F rotates. The mode plate 113F, the lock plate 119, the slide plate 118, the head plate arm 121 and the head plate make a series of movements similar to those described for the play state. However, contrarily to the play state, since the plunger 102R is not initially activated, the mode plate 113R does not move. Consequently, since only the mode plate 113F advances, the forward drive portion side of the joint plate 122 rotates counterclockwise. Then the guide pin 122a of the joint plate 122 slides in the guide ditch 124 of the fast forward and reverse drive plate 123 and displaces the fast forward and reverse drive plate 123 toward the forward drive portion side. Due to this movement the idler coupled with the plate moves to engage with the reel base gear and the fly wheel gear of the forward side and thus the fast forward drive is performed.

The reverse operation is basically identical to the forward operation only with a difference that the movements of the forward drive portion side are replaced by those of the reverse drive portion side. That is, due to the fact that the plunger 102R is attracted and only the mode plate 113R is displaced, the reverse drive portion side of the joint plate 122 rotates clockwise and the fast forward and reverse drive plate 123 is displaced by the guide pin 122a toward the reverse side. Then the idler moves to engage with the reel base gear and the fly wheel gear of the reverse side and the reverse drive is performed.

Figure 15:
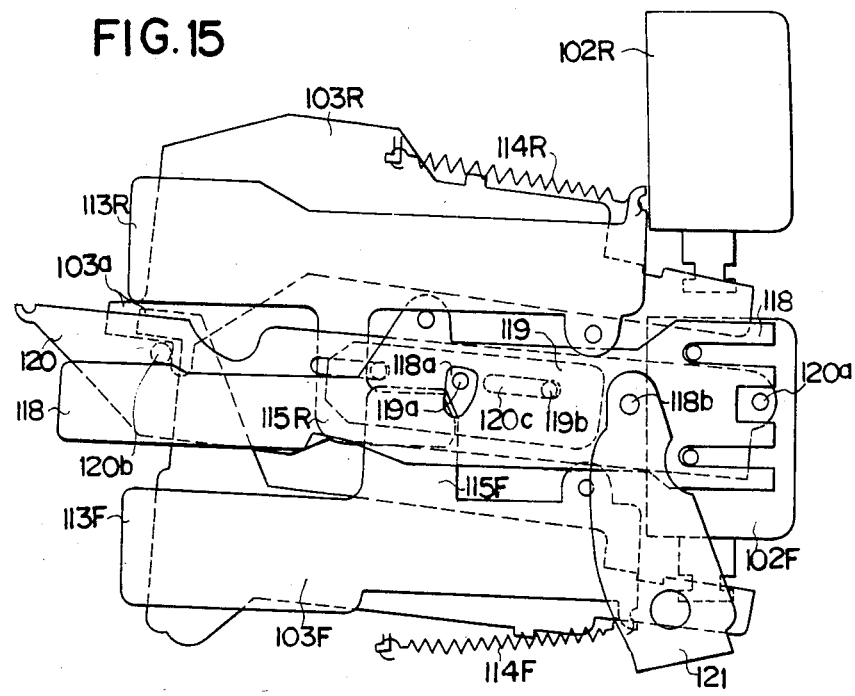
FIG. 15 is a plan view showing the same relation as shown in FIG. 13 for explaining the transition from the working state to the stop state.

(5) Stop from the Play State . . . FIG. 15

When the system is in the forward play state, the stop state is entered by turning solenoid 102F off.

When a stop command is received in the play state, the plunger 102F becomes OFF and the lock plate 103F rotates clockwise due to a spring. At this time the roller 109a of the lock plate 119 held in a space formed by the ramified hole 118a of the slide plate 118 and the extension extremity of the extension parts 115F, 115R in the mode plates 113F, 113R is pressed from both the sides in oblique directions toward the reverse side by the force applied to the mode plates 113F, 113R in the advance direction and the force applied to the slide plate 118 in the retreat direction due to the energizing force of the head plate in the retreat direction. Consequently the lock link 120 released from the engagement of the lock arm 103F rotates clockwise together with the lock plate 119 and the roller 119a leaves the press parts of the mode plates 113F, 113R. As a result the slide plate 118 and the lock plate 119 become slidable, and since an energizing force in the retreat direction of the head plate is applied thereto, they retreat to the stop position.

On the other hand, since due to the rotation of the lock arm 103F the locking by the mode hook 108F of the cam gear 106F is released, (See FIG. 11), the cam gear 106F rotates due to the energizing force of the spring plate 111F, etc., until the stop hook touches the lock arm 103F. Due to this rotation the mode plate 113F is retreated by the force of the spring 114F to the stop position, while pressing the driving cam 112F.

Further the stop operation from the fast reverse state as indicated in FIG. 12 is performed similarly.

Figure 16:
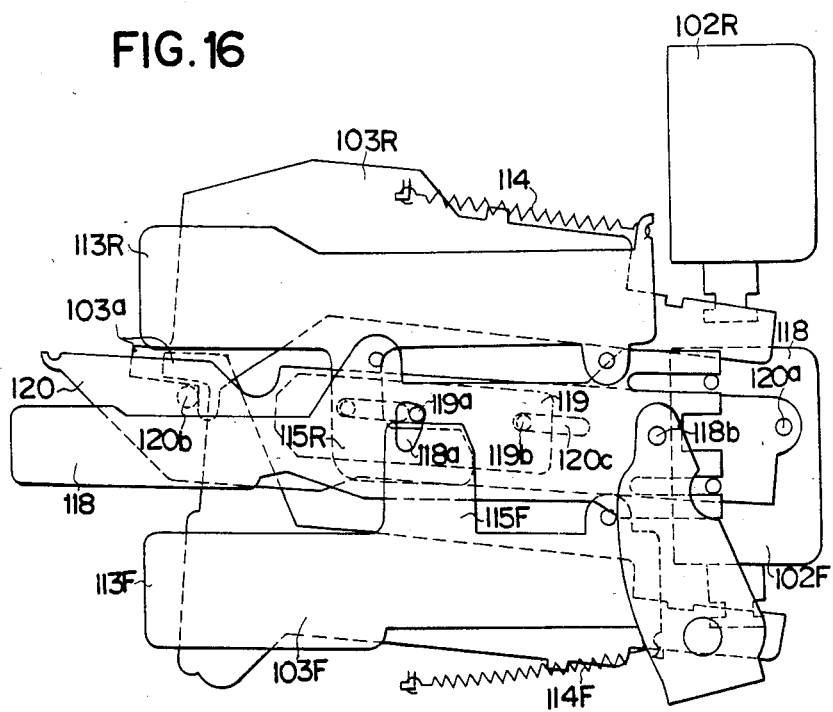
FIG. 16 is a plan view showing the same relation as that shown in FIG. 13 for explainihg the transition from the key-off state to the stop state.

(6) Stop at a Key-Off . . . FIG. 16

When the key of the vehicle is taken off in the course of an operation change and the power source is suddenly switched-off, then in the same manner as that described for the stop operation, via plunger off, lock arm rotation and lock link rotation, the roller 119a of the lock plate leaves the extension part of the mode plate, and due to this movement the slide plate and the head plate return to the stop position. Even if the cam gear and the mode plate are stopped in the course of their movements by a switch off of the power source during an operation change, since this series of movements are effected independently of those of the cam gear and the mode plate, the head plate can return always to the stop position.

As explained above, according to the locking mechanism of this invention, since the locking is effected only by the plunger of the forward side at the play mode, by disposing engaging parts such as a U-shaped ditch, etc. in the head plate and engaging there a part of the fast forward and reverse drive plate, the other plunger can be utilized effectively for operations such as program, pause, etc. and thus it is possible to provide a tape player, which is smaller and more economical and whose construction is simplified.

Further, according to the key-off mechanism of this invention, even if the power source is switched off during a work or in the course of an operation change, since the head plate returns automatically to the stop position, the pressed state of the pinch roller or the idler is always released. Thus it is always possible to prevent the deterioration of the state of this press mechanism and to take out the tape.

The embodiments of the invention in which an exclusive property or privilege is claimed are defined as follows:

1. A tape player having a drive motor mounted to the player frame and comprising:
    a driving gear driven by a motor of the tape player;
    two frame-mounted cam gears disposed on opposite sides of said driving gear, each of them having a cut-off section at a part of its periphery;
    two cams, each of them being formed as a unitary body with one of said cam gears respectively;
    first and second mode plates each slidably movable between retracted and extended positions, said cams being respectively coupled to drive said mode plates;
    a head plate mounted for movement between retracted and advanced positions;
    biasing means for urging said head plate towards said retracted position;
    coupling means operable between a decoupled and a coupled condition for releasably coupling said mode plates to said head plate so that in said coupled condition movement of a mode plate from said retracted to said extended position thereof urges said head plate from said retracted to said advanced position thereof, and so that in said decoupled condition said head plate is moved to said retracted position by said biasing means;
    first and second electromagnetic plunger means for selectively locking each of said mode plates at a position corresponding to the advanced position of said head plate;
    a rotatably mounted joint plate coupled to said mode plates so as to be rotated about a centered neutral position responsively to relative movement of said mode plates with respect to each other;
    a fast forward and reverse drive plate coupled to said joint plate and movable between a play position and a fast forward or reverse position depending on the rotational position of said joint plate; and
    a search link pivotally mounted at one end to said frame and coupled to be rotated to offset positions about a central neutral orientation responsively to said relative movement of said mode plates with respect to each other during advancement of said head plate, said search link having an engaging portion provided at the other end thereof; and
    arresting portions provided on said head plate configured to selectively engage said engaging portion of said search link according to the rotational state thereof as said head plate advances, said arresting portions being configured as a ramified hole having a U-shaped ditch and a recess slot formed on either side of said U-shaped ditch, said U-shaped ditch being configured to engage said search link engaging portion when said search link is in said centered orientation so as to arrestingly terminate the advancing movement of said head plate at said advanced positions thereof, said recess slots being configured to engage said engaging portion when said search link is in an offset position to arrestingly terminate said head plate advance at a position intermediate said advanced and retracted positions thereof, said coupling means including:
    a lock link coupled so as to rotate from a dormant to an active position when either of said electromagnetic plunger means is excited and to return to said dormant position when both of said plunger means is de-energized;
    a lock plate disposed movably over a limited range on said lock link; and
    linkage means for linking said lock plate with said head plate by engaging said lock plate with said mode plates when the lock link is rotated to said active position.

2. The tape player of claim 1 wherein said linkage means includes a slide plate having a hole thereon and mounted for motion between a retracted and an extended position and coupled to move said head plate responsively to said slide plate motion, said lock plate is provided with a pin thereon disposed to pass through said hole, said mode plates are provided with engaging portions thereon disposed to confrontingly drivingly engage said pin when said lock link is rotated into said active position so that advancing either of said mode plates drives said pin to engage said hole to advance said head plate, and so that rotation of said lock link to said dormant position disengages the coupling between said mode plates and said slide plate.

3. The tape player of claim 1 wherein said hole is configured with a portion elongated in the direction of rotation of said lock link, and wherein said engaging portions of said mode plates are inclined in the direction of rotation of said lock link.

* * * * *